United States Patent
Kumar et al.

(10) Patent No.: US 12,493,743 B2
(45) Date of Patent: Dec. 9, 2025

(54) SYSTEMS AND METHODS FOR GENERATING A CONVERSATION SUMMARY FROM CONVERSATIONAL DATA USING A LANGUAGE TRANSFORMATION MODEL

(71) Applicant: Verizon Patent and Licensing Inc., Basking Ridge, NJ (US)

(72) Inventors: Durgesh Kumar, Bangalore (IN); Saurabh Tahiliani, Noida (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 266 days.

(21) Appl. No.: 18/335,942

(22) Filed: Jun. 15, 2023

(65) Prior Publication Data
US 2024/0419901 A1    Dec. 19, 2024

(51) Int. Cl.
*G06F 40/284* (2020.01)
*G06F 16/34* (2025.01)
*G06F 40/289* (2020.01)

(52) U.S. Cl.
CPC .......... *G06F 40/284* (2020.01); *G06F 16/345* (2019.01); *G06F 40/289* (2020.01)

(58) Field of Classification Search
CPC .... G06F 40/284; G06F 16/345; G06F 40/289; G06F 40/295; G06F 40/30; G06F 40/35
See application file for complete search history.

(56) References Cited

U.S. PATENT DOCUMENTS

| | | | |
|---|---|---|---|
| 10,860,685 B2 * | 12/2020 | Co | G10L 15/142 |
| 2021/0064956 A1 * | 3/2021 | Zhiltsov | G06F 17/18 |
| 2021/0126999 A1 * | 4/2021 | Sachdev | H04M 1/72436 |
| 2021/0303798 A1 * | 9/2021 | Duong | H04L 51/02 |
| 2021/0375289 A1 * | 12/2021 | Zhu | G10L 15/22 |
| 2023/0112369 A1 * | 4/2023 | Chopra | G06N 3/044 |
| | | | 705/304 |
| 2024/0211692 A1 * | 6/2024 | Zou | G06F 16/3329 |

* cited by examiner

*Primary Examiner* — Athar N Pasha

(57) ABSTRACT

A device may receive text data associated with a chatbot, a live chat, or an interactive voice response system, and may preprocess the text data with one or more preprocessing techniques to generate preprocessed data and key intents. The device may convert the preprocessed data and the key intents into embeddings, and may combine the embeddings into an input vector. The device may process the input vector, with a language model, to identify relationships between words and phrases of the text data, and may process the input vector and the relationships, with a summary generation model, to generate a summary of the text data. The device may perform one or more actions based on the summary of the text data.

20 Claims, 10 Drawing Sheets

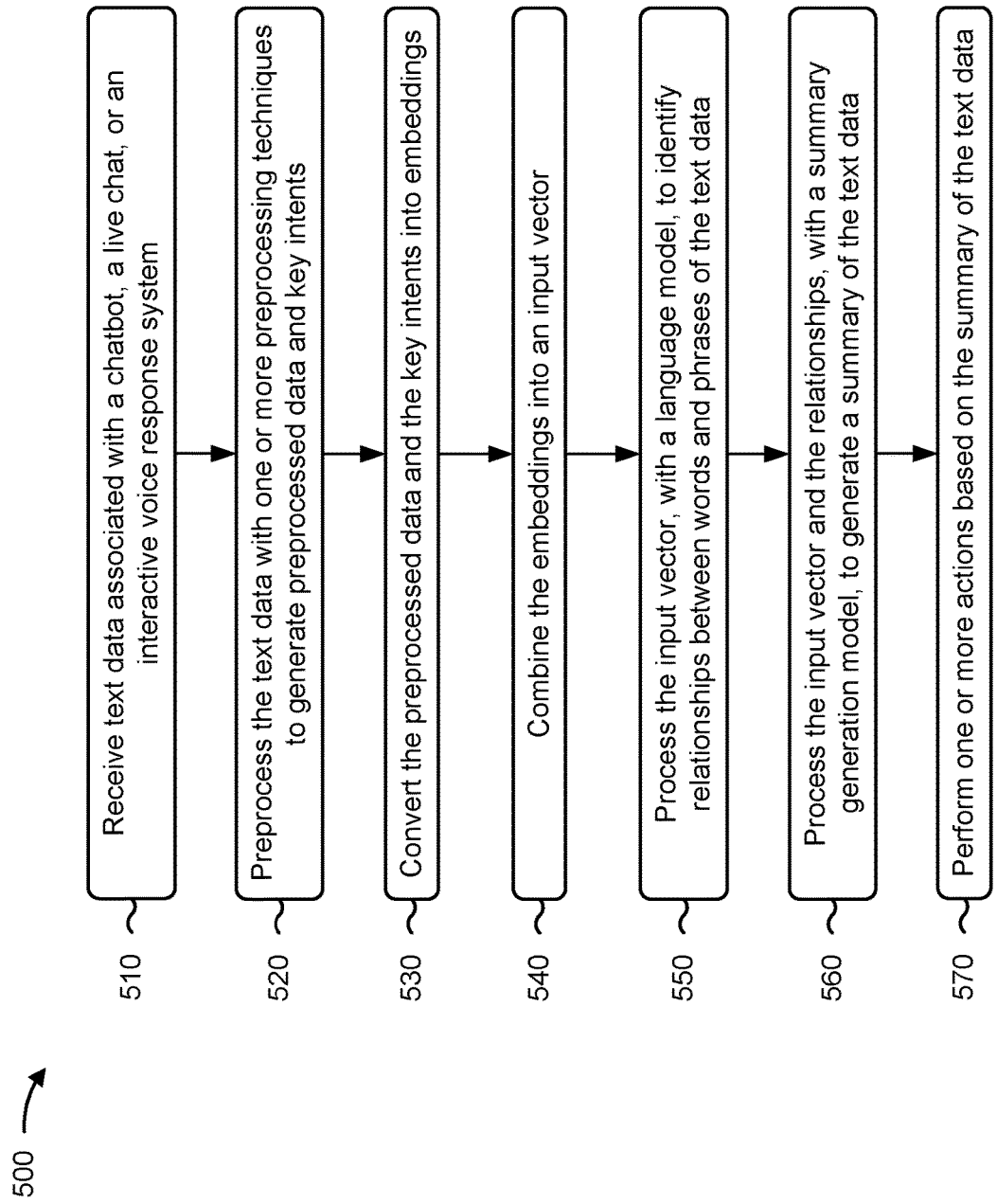

SYSTEMS AND METHODS FOR GENERATING A CONVERSATION SUMMARY FROM CONVERSATIONAL DATA USING A LANGUAGE TRANSFORMATION MODEL

BACKGROUND

A user device (e.g., a mobile telephone, a tablet computer, a desktop computer and/or the like) may utilize applications that enable the user device to conduct calls, conduct live chats, provide interactive voice responses (IVRs), provide inputs to chatbots, and/or the like.

BRIEF DESCRIPTION OF THE DRAWINGS

FIG. 5 is a flowchart of an example process for generating a conversation summary from text data using a language transformation model.

DETAILED DESCRIPTION OF EXAMPLE EMBODIMENTS

Figure 1A:
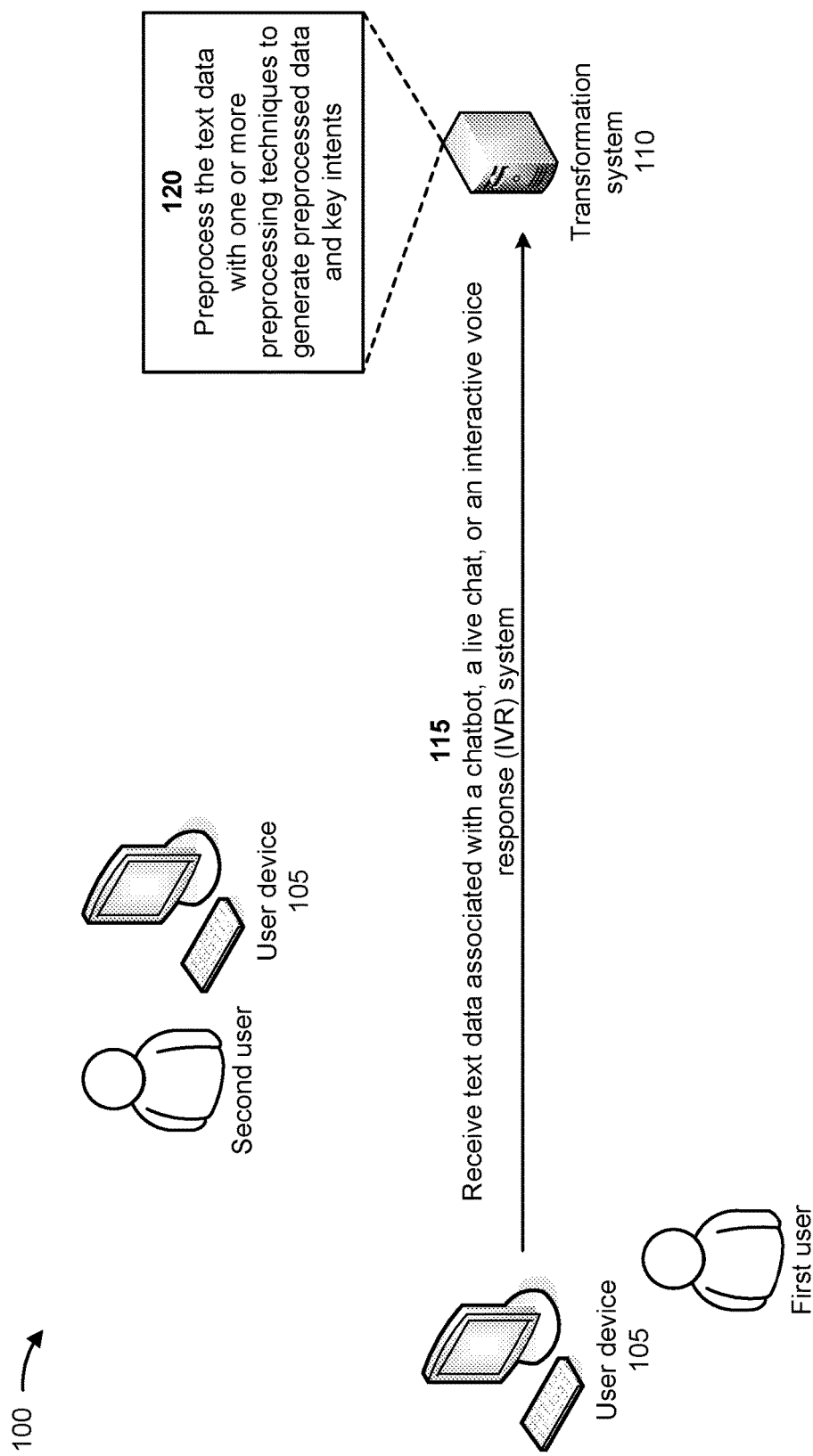
FIGS. 1A-1F are diagrams of an example associated with generating a conversation summary from text data using a language transformation model.

The following detailed description of example implementations refers to the accompanying drawings. The same reference numbers in different drawings may identify the same or similar elements.

A call center may receive millions of calls or chats, with each conversation (call or chat) spanning from few seconds to nearly an hour. A call center representative may be responsible for writing remarks about each call or chat that describe an intent of the caller or chatter and a resolution provided. This is a repetitive task that is time consuming and that generates remarks that are difficult to navigate and overwhelming (e.g., due to irrelevant details, system jargon, duplicate information, and/or the like). Thus, huge volumes of unstructured and/or structured call or chat transcript data require extraction of meaningful information and/or phrases in order to provide summaries of whole conversations. The transcript data may include any type of text-based or call-transcript-based conversations received via chatbots, live chats, calls, interactive voice responses, and/or the like. Manual identification of the meaningful information and/or phrases is impractical due to the sheer size of the transcript data. However, identification of the meaningful information and/or phrases in transcript data may provide summaries of whole conversations; a quick understanding of customer journeys, issues, and needs; an improved search experience; identification of novel categories; and/or the like.

Thus, current techniques for identifying meaningful information and/or phrases in transcript data consume computing resources (e.g., processing resources, memory resources, communication resources, and/or the like), networking resources, and/or other resources associated with failing to identify meaningful information and/or phrases in transcript data, failing to identify summaries of conversations provided in transcript data, being unable to utilize the meaningful information and/or phrases and the summaries of conversations, and/or the like.

Some implementations described herein provide a transformation system that generates a conversation summary from text data using a language transformation model. For example, the transformation system may receive text data associated with a chatbot, a live chat, or an interactive voice response system, and may preprocess the text data with one or more preprocessing techniques to generate preprocessed data and key intents. The transformation system may convert the preprocessed data and the key intents into embeddings, and may combine the embeddings into an input vector. The transformation system may process the input vector, with a language model (e.g., an encoder with masking logic), to identify relationships between words and phrases of the text data, and may process the input vector and the relationships, with a summary generation model (e.g., a beam search model), to generate a summary of the text data. The transformation system may perform one or more actions based on the summary of the text data.

In this way, the transformation system generates a conversation summary from text data using a language transformation model. For example, the transformation system may receive a transcript with text data, and may transform the text data into preprocessed data (e.g., tokens, parts of speech tagging for the tokens, replaced pronouns, and/or the like) and key intents of the text data. The transformation system may process the preprocessed data and the key intents, with a language model, to generate a conversation summary for the transcript. The transformation system may utilize the conversation summary to understand a customer journey, a customer issue, and/or a customer need, to provide an improved search experience, to identify novel categories, and/or the like. Thus, the transformation system may conserve computing resources, networking resources, and/or other resources that would have otherwise been consumed by failing to identify meaningful information and/or phrases in text data, failing to identify summaries of conversations provided in text data, being unable to utilize the meaningful information and/or phrases and the summaries of conversations, and/or the like.

FIGS. 1A-1F are diagrams of an example 100 associated with generating a conversation summary from text data using a language transformation model. As shown in FIGS. 1A-1F, example 100 includes user devices 105 associated with respective users (e.g., a first user and a second user) and a transformation system 110. Further details of the user devices 105 and the transformation system 110 are provided elsewhere herein.

As shown in FIG. 1A, and by reference number 115, the transformation system 110 may receive text data associated with a chatbot, a live chat, or an interactive voice response (IVR) system. For example, the first user device 105 and the second user device 105 (or another device, such as a server device, a cloud-based device, and/or the like) may provide a chatbot application, a live chat application, an IVR system application, a voice or video call application, and/or the like. The first user may utilize the applications to cause the first user device 105 to conduct voice or video calls, conduct live chats, provide interactive voice responses to the IVR system, provide inputs to chatbots, and/or the like. The first user device 105 and/or the second user device 105 may convert the voice or video calls from audio data to text data (e.g., call transcripts), may save the text data input via the live chats and the chatbots, may convert the interactive voice responses from audio data to text data, and/or the like. The first user device 105 and/or the second user device 105 may provide the text data to the transformation system 110, and the transformation system 110 may receive the text data. In some implementations, the transformation system 110 may continuously receive the text data in real time from the first user device 105 and/or the second user device 105, may periodically receive the text data from the first user device 105 and/or the second user device 105, may receive the text data from the first user device 105 and/or the second user device 105 based on requesting the text data, and/or the like.

As further shown in FIG. 1A, and by reference number 120, the transformation system 110 may preprocess the text data with one or more preprocessing techniques to generate preprocessed data and key intents. For example, the one or more preprocessing techniques may include a stop-word removal technique, a bad character removal technique, an abbreviation regular expression (regex) technique, a placeholder replace technique, a custom noun entity technique, a lemmatization technique, and/or the like. The transformation system 110 may perform the stop-word removal technique on the text data to generate the preprocessed data (e.g., by removing words that occur commonly in the text data, such as articles or pronouns). The transformation system 110 may perform the bad character removal technique on the text data to generate the preprocessed data (e.g., by removing unwanted characters from the text data). The transformation system 110 may perform the abbreviation regular expression technique on the text data to generate the preprocessed data (e.g., by generating regular expressions from abbreviations in the text data). The transformation system 110 may perform the placeholder replace technique on the text data to generate the preprocessed data (e.g., by replacing placeholders in the text data with actual information). The transformation system 110 may perform the custom noun entity technique on the text data to generate the preprocessed data (e.g., by identifying proper nouns in the text data). The transformation system 110 may perform the lemmatization technique on the text data to generate the preprocessed data (e.g., by grouping together different inflected forms of a same word).

In some implementations, when preprocessing the text data with the one or more preprocessing techniques to generate the preprocessed data and the key intents, the transformation system 110 may determine a conversational format of the text data (e.g., to aid in further preprocessing the text data), may generate tokens for the text data, may provide parts of speech tags for the tokens, may replace pronouns in the text data with nouns, may generate discourse labels for the text data, may filter utterances in the text data, and/or the like. When determining the conversational format of the text data, the transformation system 110 may determine whether the text data is a debate format, a dialogue format, a discourse format, a diatribe format, a question-answer format, a passive format, an aggressive format, a passive-aggressive format, an assertive format, a call format, a chat format, an IVR response format, a chatbot format, and/or the like. When generating tokens for the text data, the transformation system 110 may divide the text data into units called tokens. The tokens may be individual words, phrases, or whole sentences. In the process of tokenization, the transformation system 110 may discard some characters, such as punctuation marks.

When providing parts of speech tags for the tokens, the transformation system 110 may assign, to the tokens, parts of speech tags that correspond to particular parts of speech (e.g., based on definitions), such as nouns, verbs, adjectives, adverbs, and/or the like. When replacing the pronouns in the text data with nouns, the transformation system 110 may identify the pronouns and may replace the pronouns with appropriate nouns (e.g., replace "them" with "subscribers"). When generating discourse labels for the text data, the transformation system 110 may generate discourse labels, such as a statement-non-opinion label (e.g., "I'm in the legal department"), an acknowledgement label (e.g., "Uh-huh"), a statement-opinion label (e.g., "I think it's great"), an accept/agree label (e.g., "That's exactly it"), a turn-exit label (e.g., "So, . . . "), an appreciation label (e.g., "I can imagine"), a yes-no question label (e.g., "Do you have any special training?"), a non-verbal label (e.g., laughter or throat clearing), a yes answer label (e.g., "Yes"), a conventional-closing label (e.g., "Well, it's been nice talking to you"), and/or the like. When filtering utterances in the text data, the transformation system 110 may filter generic utterances from the text data.

In some implementations, when preprocessing the text data with the one or more preprocessing techniques to generate the key intents, the transformation system may identify utterances in the text data, and may generate parts of speech tags for the text data (e.g., by assigning parts of speech tags that correspond to particular parts of speech, such as nouns, verbs, adjectives, adverbs, and/or the like). The transformation system 110 may perform parts of speech sequencing on the parts of speech tags to generate sequenced parts of speech tags, and may detect co-occurrences of words or phrases in the text data. The transformation system 110 may generate the key intents based on the utterances, the sequenced parts of speech tags, and the co-occurrences. The key intents may include purposes of speakers associated with the text data, subject matter of the text data, and/or the like.

Figure 1B:
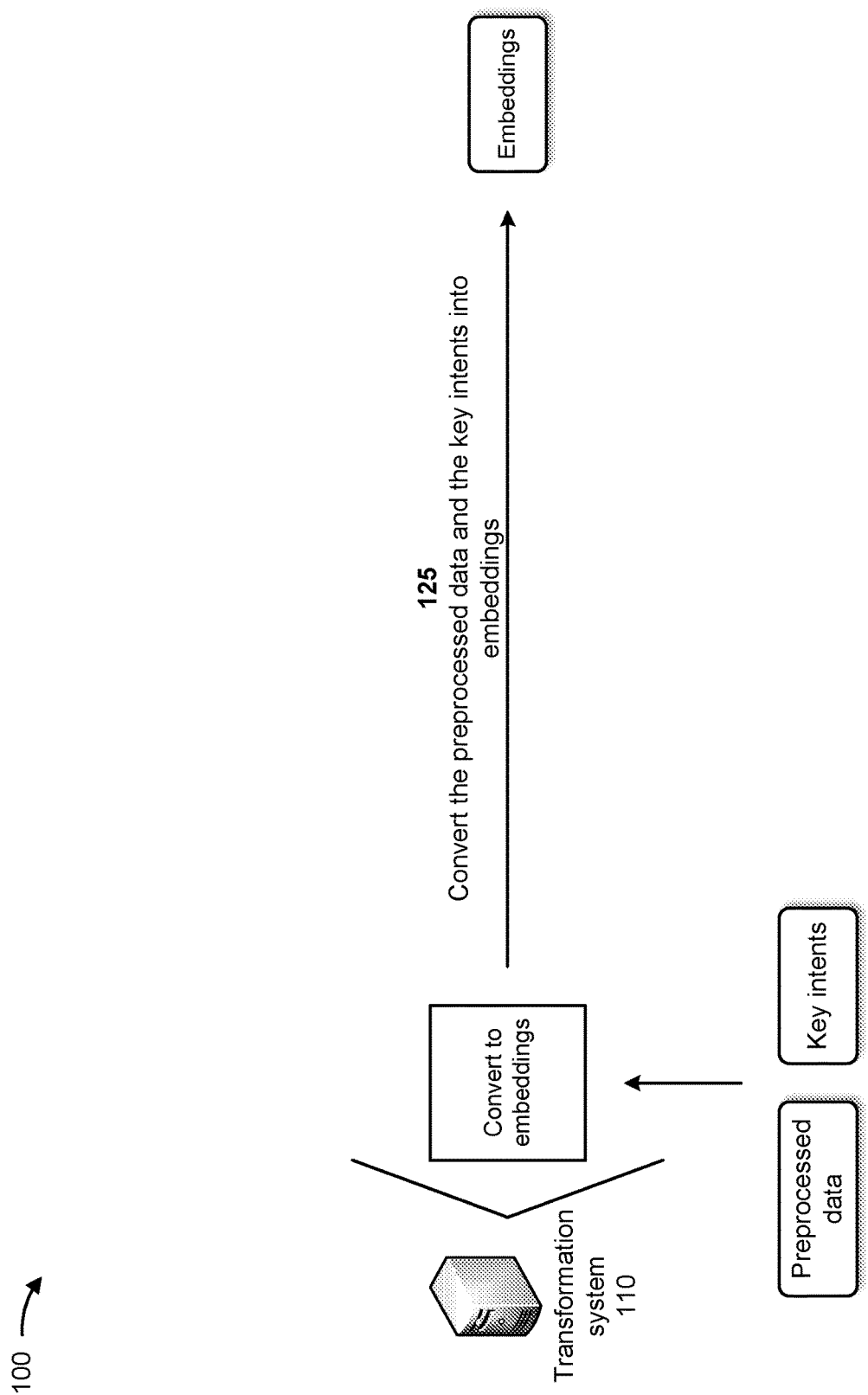

As shown in FIG. 1B, and by reference number 125, the transformation system 110 may convert the preprocessed data and the key intents into embeddings. For example, when converting the preprocessed data and the key intents into the embeddings (e.g., numerical representations of the preprocessed data and the key intents), the transformation system may utilize a count vectorization technique, a bag of words technique, an N-gram vectorization technique, a term frequency-inverse document frequency (TF-IDF) vectorization technique, a one-hot encoding technique, and/or the like to convert the preprocessed data and the key intents into the embeddings.

The count vectorization technique may include creating a document term matrix that includes a set of dummy variables that indicate if a particular word appears in the document. The bag of words technique may convert text content into numerical feature vectors. The bag of words technique may convert a document into a numeric vector by mapping each document word to a feature vector. The N-gram vectorization technique may include generating a document term matrix in which each cell represents a word count. The count vectorization technique is a special case of the N-gram vectorization technique (e.g., where N=1). The TF-IDF vectorization technique may include determining a measure that takes an importance of a word into consideration depending on how frequently the word occurs in a document and a corpus. Term frequency denotes the frequency of a word in a document. Inverse document frequency measures an importance of the word in the corpus. The one-hot encoding technique may include representing each unique word in a vocabulary by setting a unique token with a value of one and by setting a value of zero at other positions in the embedding (e.g., a vector).

Figure 1C:
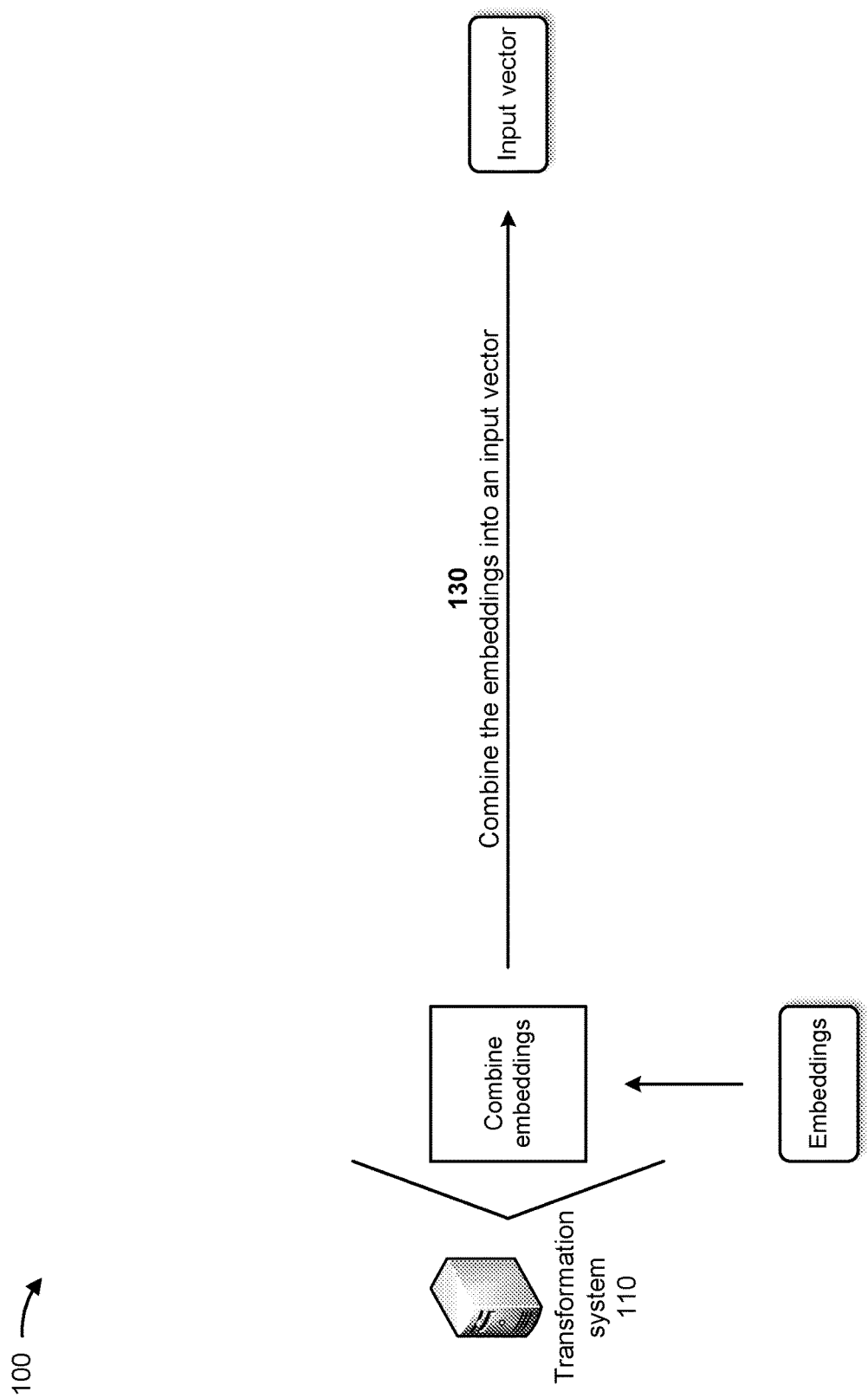

As shown in FIG. 1C, and by reference number 130, the transformation system 110 may combine the embeddings into an input vector. For example, since the embeddings include a series of a numbers representative of the preprocessed data and the key intents, the transformation system 110 may combine the embeddings into the input vector by adding the embeddings together to generate the input vector. In some implementations, when combining the embeddings into the input vector, the transformation system 110 may average the embeddings to generate the input vector.

Figure 1D:
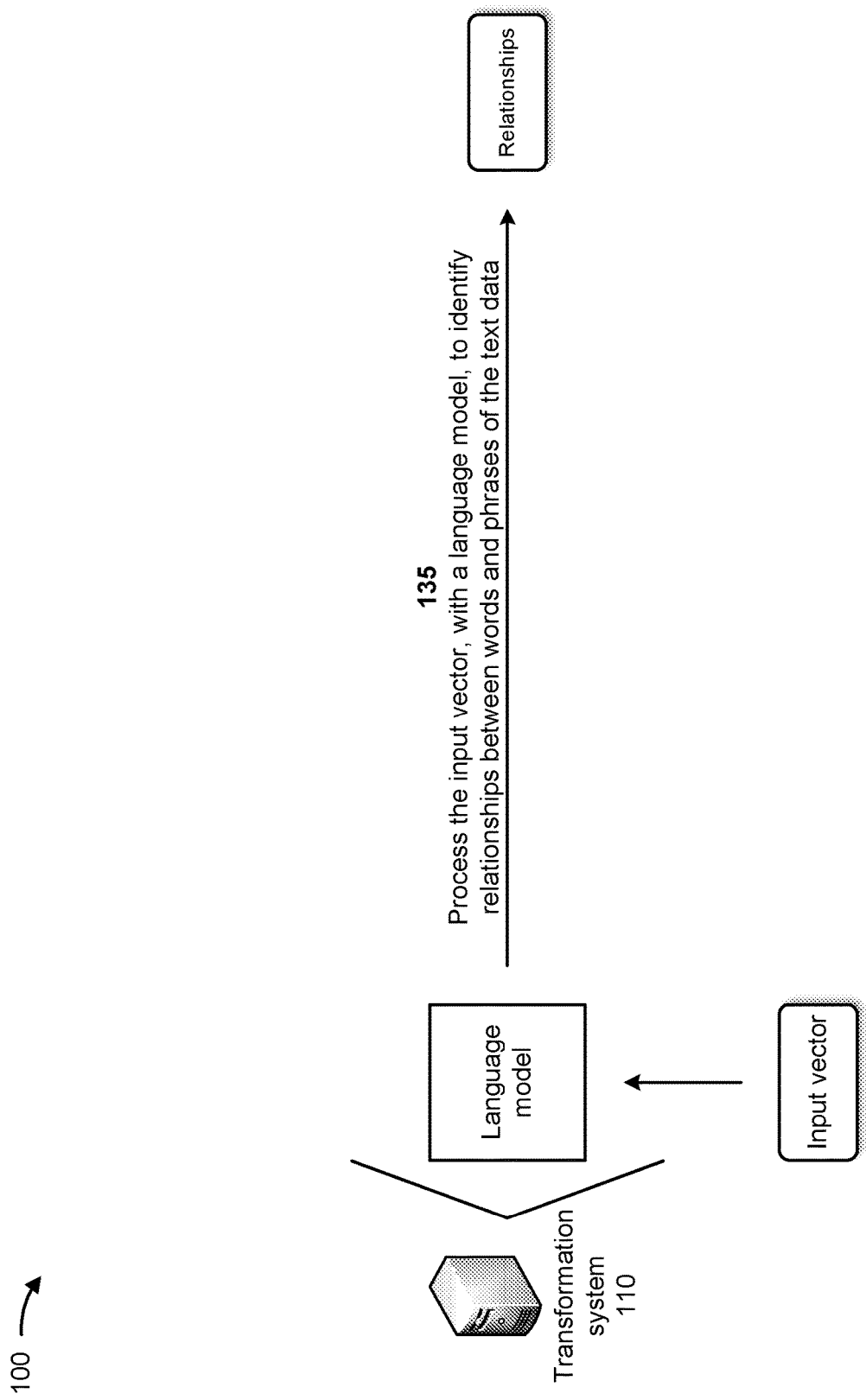

As shown in FIG. 1D, and by reference number 135, the transformation system 110 may process the input vector, with a language model, to identify relationships between words and phrases of the text data. For example, the transformation system 110 may include or be associated with a language model that includes an encoder with masking logic. The masking logic may mask tokens in sentences with masks (e.g., a noun mask, a verb mask, an adjective mask, and/or the like). The encoder may be configured or trained to capture relationships between different words and phrases, and to represent the words and the phrases while maintaining connections between the words and the phrases. The language model (e.g., the encoder) may receive the input vector, and may identify the relationships between the words and the phrases of the text data based on the input vector. In some implementations, the relationships between the words and the phrases of the text data may include the connections between the words and the phrases.

Figure 1E:
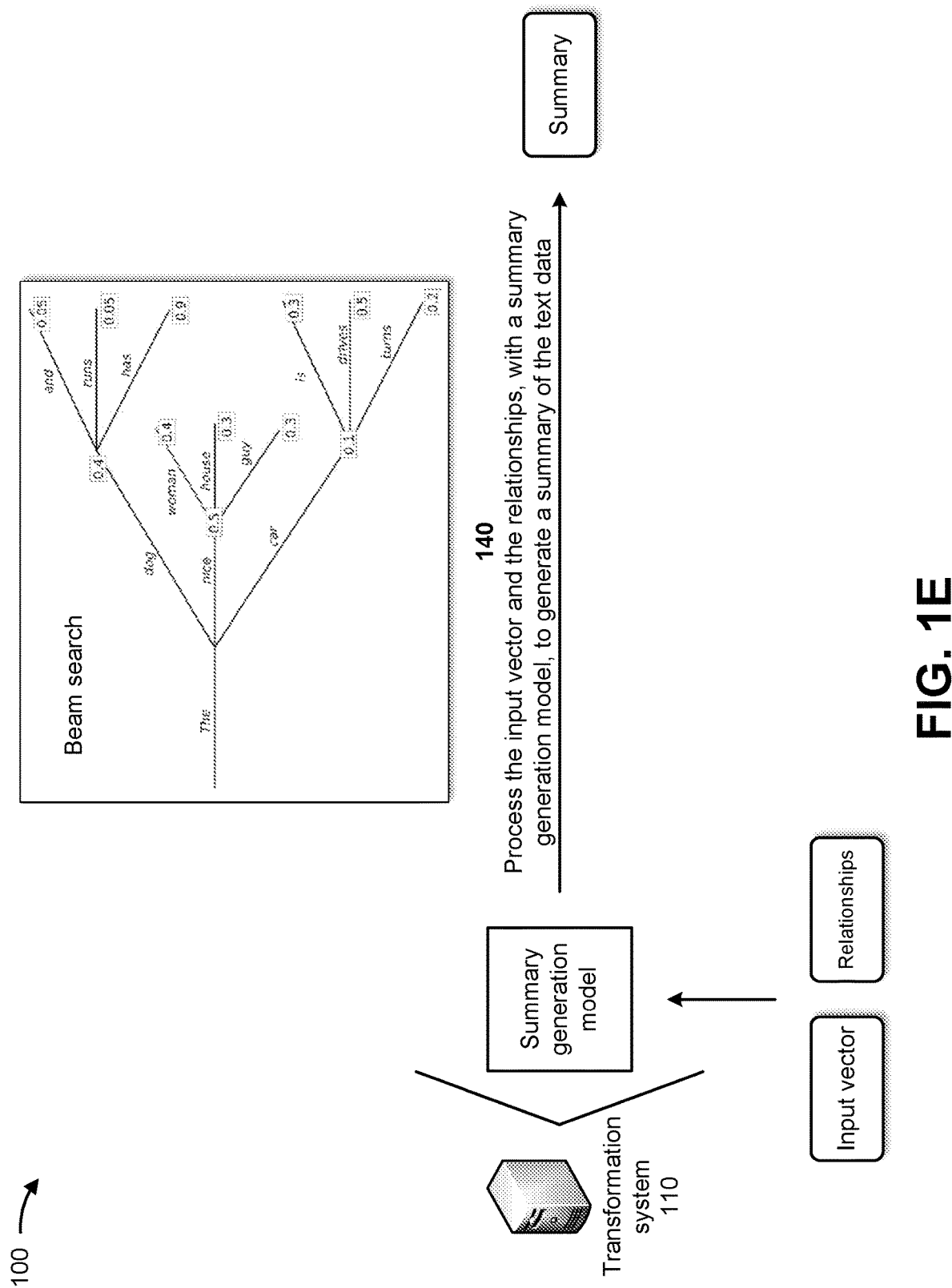

As shown in FIG. 1E, and by reference number 140, the transformation system 110 may process the input vector and the relationships, with a summary generation model, to generate a summary of the text data. For example, the transformation system 110 may utilize the summary generation model to determine the summary of the text data based on the input vector and the relationships between the words and the phrases of the text data. In some implementations, when processing the input vector and the relationships, with the summary generation model, to generate the summary of the text data, the transformation system 110 may utilize a beam search with the input vector and the relationships to generate the summary of the text data. The beam search may correspond to the summary generation model. The beam search may reduce a risk of missing hidden high probability word sequences by maintaining a most likely quantity of hypotheses at each time step and eventually selecting a hypothesis with an overall highest probability. The beam search may include a heuristic search model that analyzes a graph by expanding a most promising node in a limited set. The beam search may be an optimization of the best-first search model that orders all partial solutions (states) according to some heuristic. However, in beam search, only a predetermined quantity of best partial solutions are maintained as candidate solutions.

Figure 1F:
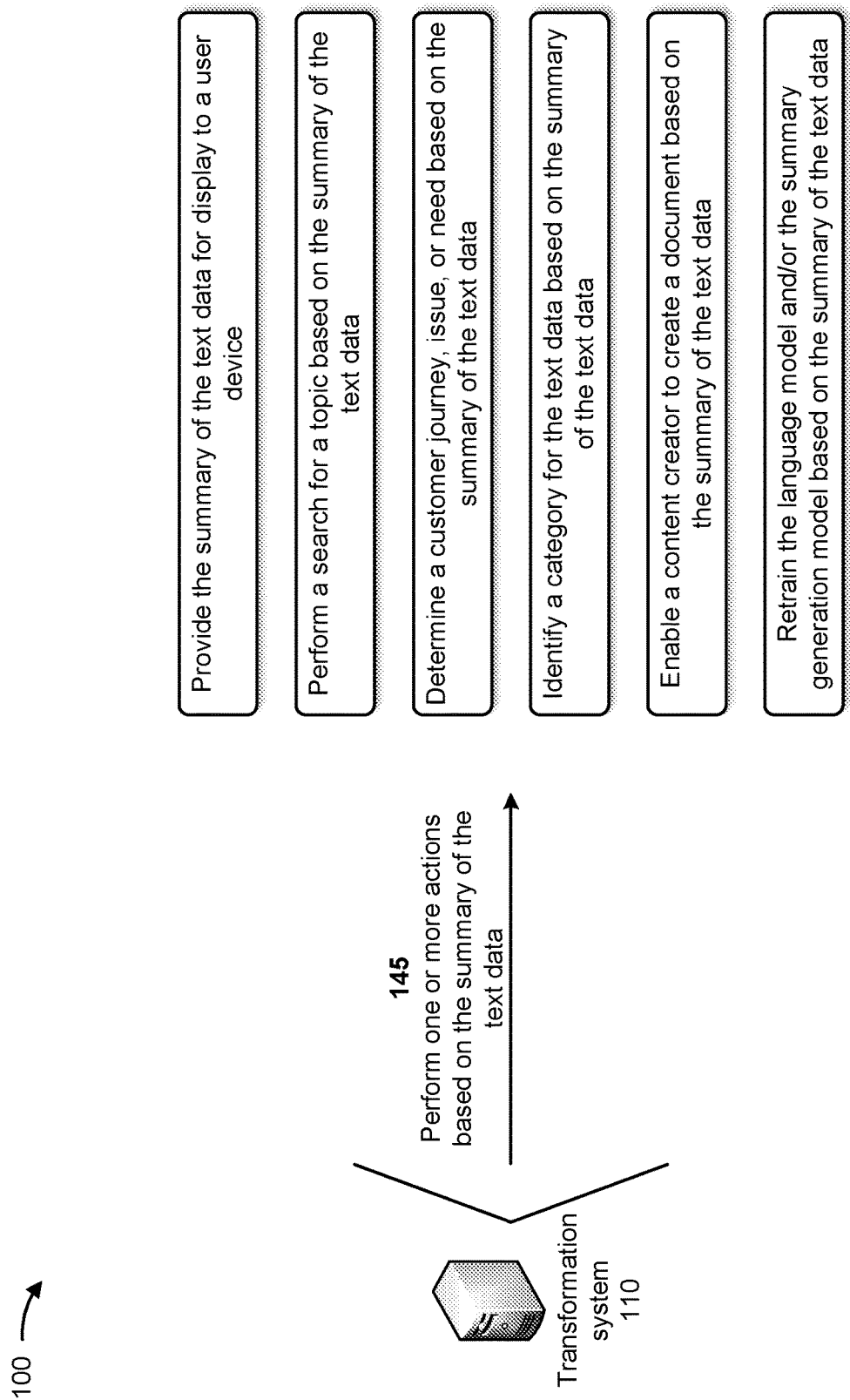

As shown in FIG. 1F, and by reference number 145, the transformation system 110 may perform one or more actions based on the summary of the text data. In some implementations, performing the one or more actions includes the transformation system 110 providing the summary of the text data for display to a user device. For example, the transformation system 110 may provide information identifying the summary of the text data to the first user device 105, and the first user device 105 may display the information identifying the summary of the text data to the first user. The first user may utilize the summary of the text data to assist the second user with the summary of the text data. In this way, the transformation system 110 conserves computing resources, networking resources, and/or other resources that would have otherwise been consumed by failing to identify meaningful information and/or phrases in text data.

In some implementations, performing the one or more actions includes the transformation system 110 performing a search for a topic based on the summary of the text data. For example, the transformation system 110 may utilize the summary of the text data to search for a topic associated with the summary, and may provide results of the search to the first user device 105. The first user device 105 may display the results of the search to the first user so that the first user may utilize the results to provide a service to the second user. In this way, the transformation system 110 conserves computing resources, networking resources, and/or other resources that would have otherwise been consumed by failing to identify summaries of conversations provided in text data.

In some implementations, performing the one or more actions includes the transformation system 110 determining a customer journey, issue, or need based on the summary of the text data. For example, if the second user is a customer and the first user is a customer service representative conversing with the second user, the transformation system 110 may determine the customer's journey, issue, or need based on the summary of the text data. The transformation system 110 may provide information identifying the customer's journey, issue, or need for display to the first user device 105 so that first user may quickly and appropriately address the customer's journey, issue, or need. In this way, the transformation system 110 conserves computing resources, networking resources, and/or other resources that would have otherwise been consumed by being unable to utilize the meaningful information and/or phrases and the summaries of conversations.

In some implementations, performing the one or more actions includes the transformation system 110 identifying a category for the text data based on the summary of the text data. For example, the transformation system 110 may identify a category (e.g., network outage) for the text data based on the summary of the text data, and may utilize the category to search for information relevant to the category (e.g., a tree has disrupted network service in a particular area). The transformation system 110 may provide the information relevant to the category to the first user device 105, and the first user device 105 may display the information to the first user. In this way, the transformation system 110 conserves computing resources, networking resources, and/or other resources that would have otherwise been consumed by failing to identify meaningful information and/or phrases in text data.

In some implementations, performing the one or more actions includes the transformation system 110 enabling a content creator to create a document based on the summary of the text data. For example, the transformation system 110 may provide the summary of the text data to a content creator (e.g., a marketing manager), and the content creator may create a document (e.g., an advertisement, a video, and/or the like) based on the summary of the text data. The content creator may provide the document to the first user device 105, and the first user device 105 may display the document to the first user. In this way, the transformation system 110 conserves computing resources, networking resources, and/or other resources that would have otherwise been consumed by failing to identify summaries of conversations provided in text data.

In some implementations, performing the one or more actions includes the transformation system 110 retraining the language model and/or the summary generation model based on the summary of the text data. For example, the transformation system 110 may utilize the summary of the text data as additional training data for retraining the language model and/or the summary generation model, thereby increasing the quantity of training data available for training the language model and/or the summary generation model. Accordingly, the transformation system 110 may conserve computing resources associated with identifying, obtaining, and/or generating historical data for training the language model and/or the summary generation model relative to other systems for identifying, obtaining, and/or generating historical data for training machine learning models.

In this way, the transformation system 110 generates a conversation summary from text data using a language transformation model. For example, the transformation system 110 may receive a transcript with text data, and may transform the text data into preprocessed data and key intents of the text data. The transformation system 110 may process the preprocessed data and the key intents, with a language model, to generate a conversation summary for the transcript. The transformation system 110 may utilize the conversation summary to understand a customer journey, a customer issue, and a customer need, to provide an improved search experience, to identify novel categories, and/or the like. Thus, the transformation system 110 may conserve computing resources, networking resources, and/or other resources that would have otherwise been consumed by failing to identify meaningful information and/or phrases in text data, failing to identify summaries of conversations provided in text data, being unable to utilize the meaningful information and/or phrases and the summaries of conversations, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
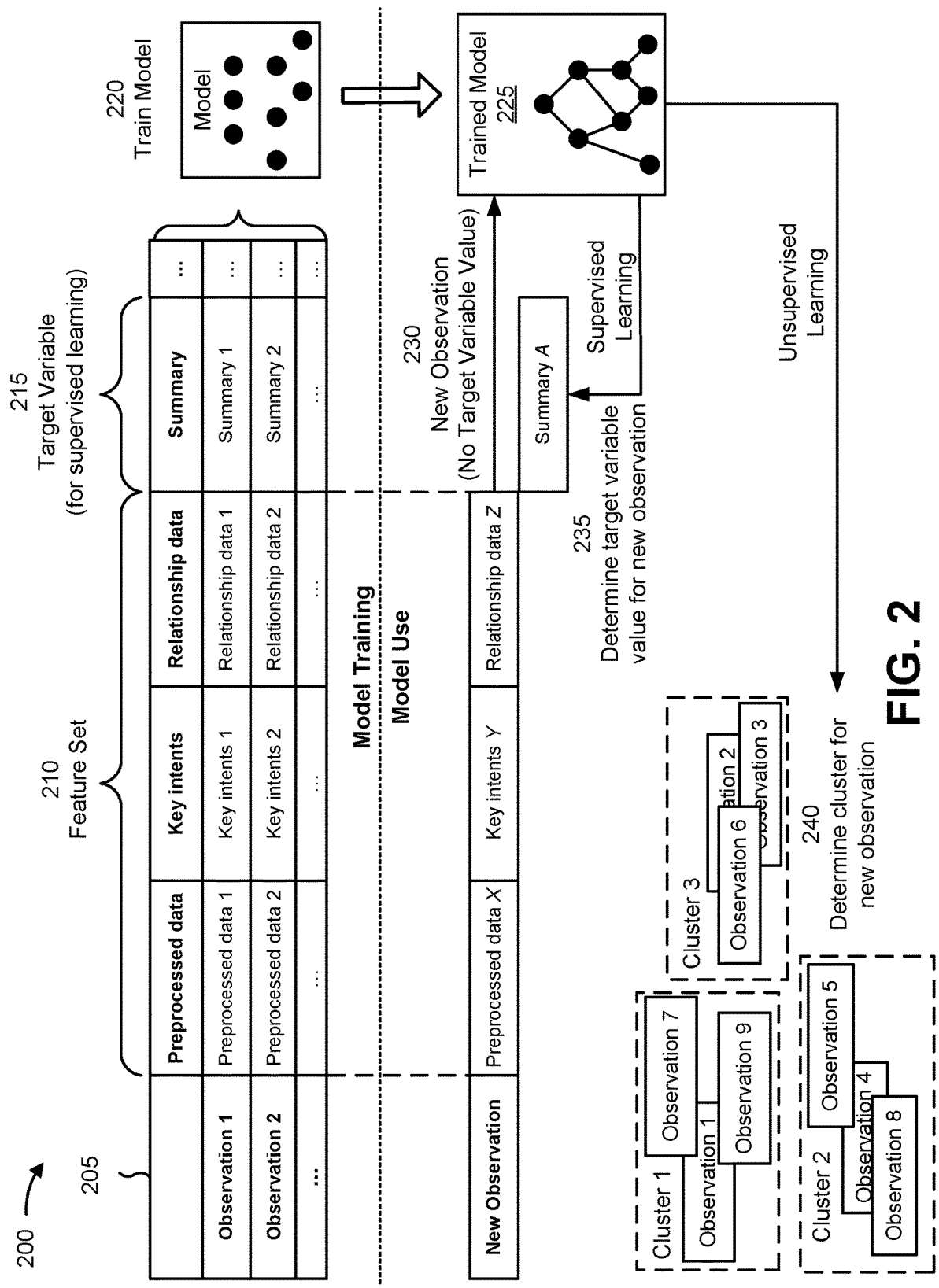
FIG. 2 is a diagram illustrating an example of training and using a machine learning model.

FIG. 2 is a diagram illustrating an example 200 of training and using a machine learning model to generate a conversation summary from text data using a language transformation model. The machine learning model training and usage described herein may be performed using a machine learning system. The machine learning system may include or may be included in a computing device, a server, a cloud computing environment, and/or the like, such as the transformation system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the transformation system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the transformation system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of preprocessed data, a second feature of key intents, a third feature of relationship data, and so on. As shown, for a first observation, the first feature may have a value of preprocessed data 1, the second feature may have a value of key intents 1, the third feature may have a value of parts of relationship data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labeled "summary" and may include a value of summary 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of preprocessed data X, a second feature of key intents Y, a third feature of relationship data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of summary A for the target variable of the summary for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a preprocessed data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a key intents cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to generate a conversation summary from text data using a language transformation model. The machine learning system enables recognition and/or identification of tens, hundreds, thousands, or millions of features and/or feature values for tens, hundreds, thousands, or millions of observations, thereby increasing accuracy and consistency and reducing delay associated with generating a conversation summary from text data using a language transformation model relative to requiring computing resources to be allocated for tens, hundreds, or thousands of operators to manually generate a conversation summary from text data using a language transformation model.

As indicated above, FIG. 2 is provided as an example. Other examples may differ from what is described in connection with FIG. 2.

Figure 3:
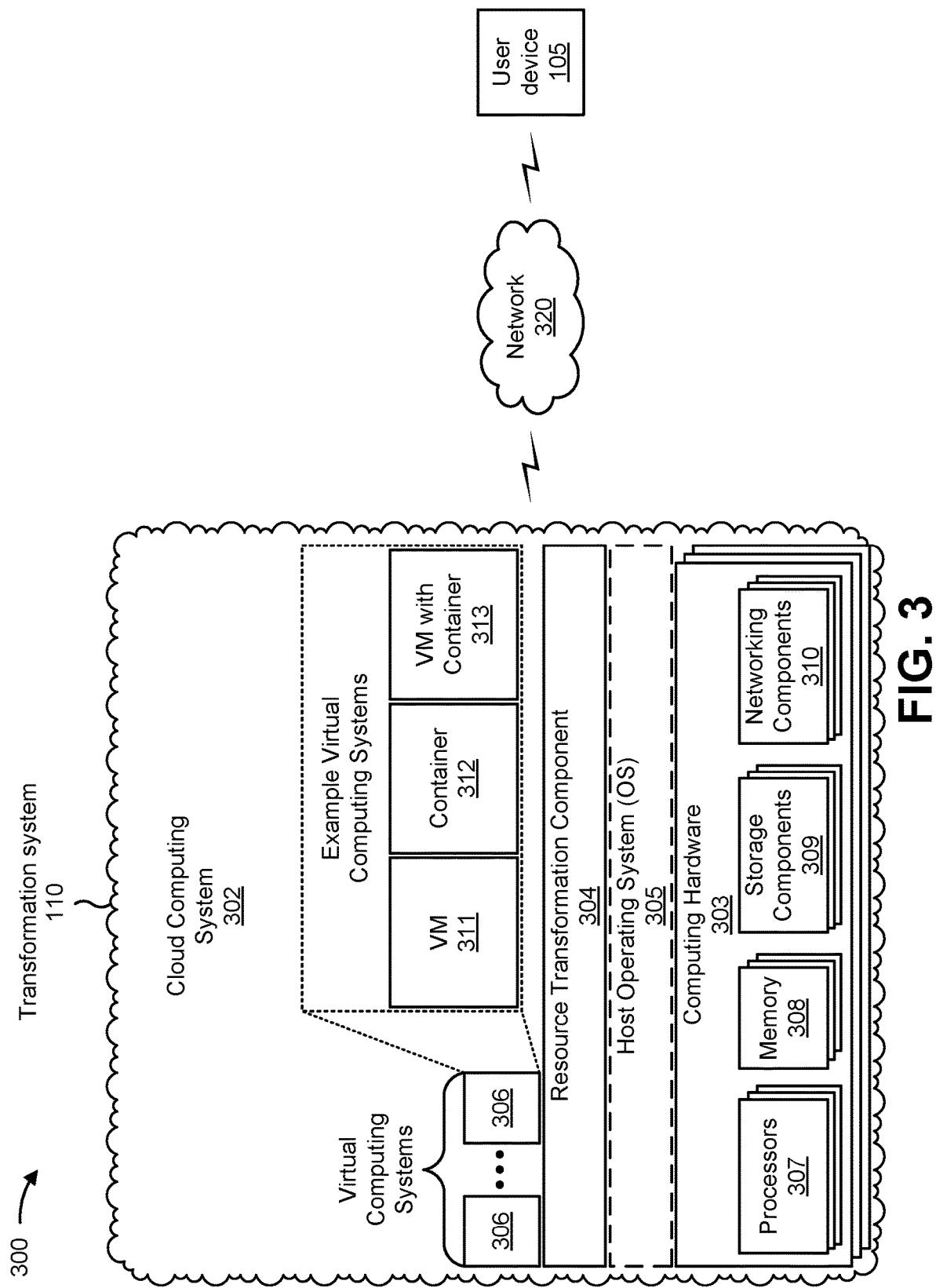
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the transformation system 110, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), an autonomous vehicle, or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the transformation system 110 may include one or more elements 303-313 of the cloud computing system 302, may execute within the cloud computing system 302, and/or may be hosted within the cloud computing system 302, in some implementations, the transformation system 110 may not be cloud-based (e.g., may be implemented outside of a cloud computing system) or may be partially cloud-based. For example, the transformation system 110 may include one or more devices that are not part of the cloud computing system 302, such as the device 400 of FIG. 4, which may include a standalone server or another type of computing device. The transformation system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
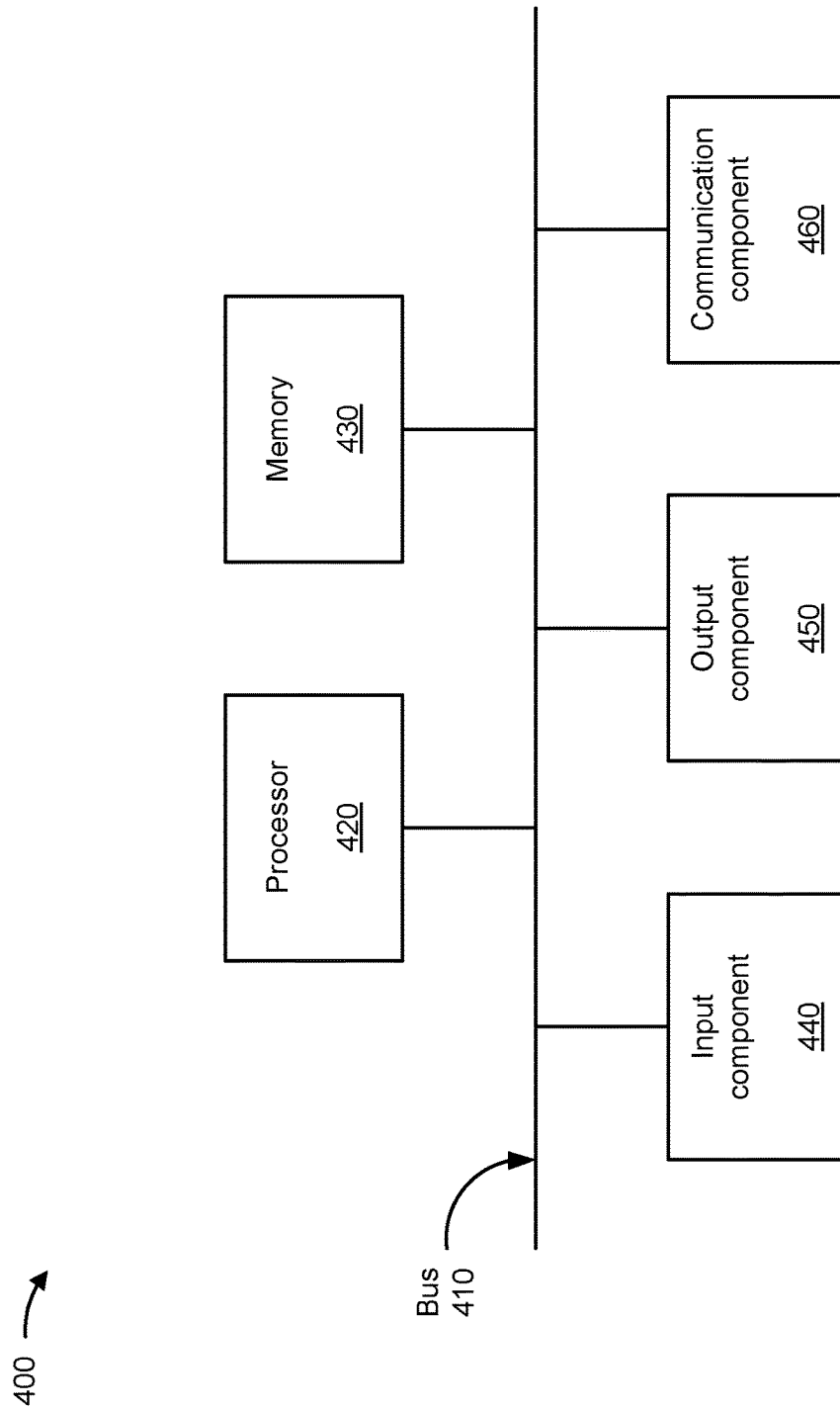
FIG. 4 is a diagram of example components of one or more devices of FIG. 3.

FIG. 4 is a diagram of example components of a device 400, which may correspond to the user device 105 and/or the transformation system 110. In some implementations, the user device 105 and/or the transformation system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for generating a conversation summary from text data using a language transformation model. In some implementations, one or more process blocks of FIG. 5 may be performed by a device (e.g., the transformation system 110). In some implementations, one or more process blocks of FIG. 5 may be performed by another device or a group of devices separate from or including the device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving conversational (e.g., text) data associated with a chatbot, a live chat, or an interactive voice response system (block 510). For example, the device may receive conversational (e.g., text) data associated with a chatbot, a live chat, or an interactive voice response system, as described above.

As further shown in FIG. 5, process 500 may include preprocessing the text data with one or more preprocessing techniques to generate preprocessed data and key intents (block 520). For example, the device may preprocess the text data with one or more preprocessing techniques to generate preprocessed data and key intents, as described above. In some implementations, preprocessing the text data with the one or more preprocessing techniques to generate the preprocessed data and the key intents includes one or more of determining a conversational format of the text data, generating tokens for the text data, providing parts of speech tags for the tokens, replacing pronouns in the text data with nouns, generating discourse labels for the text data, or filtering utterances in the text data.

In some implementations, preprocessing the text data with the one or more preprocessing techniques to generate the preprocessed data includes one or more of performing a stop-word removal technique on the text data to generate the preprocessed data, performing a bad character removal technique on the text data to generate the preprocessed data, performing an abbreviation regular expression technique on the text data to generate the preprocessed data, performing a placeholder replace technique on the text data to generate the preprocessed data, performing a custom noun entity technique on the text data to generate the preprocessed data, or performing a lemmatization technique on the text data to generate the preprocessed data. In some implementations, preprocessing the text data with the one or more preprocessing techniques to generate the key intents includes identifying utterances in the text data, generating parts of speech tags for the text data, performing parts of speech sequencing on the parts of speech tags to generate sequenced parts of speech tags, detecting co-occurrences of words or phrases in the text data, and generating the key intents based on the utterances, the sequenced parts of speech tags, and the co-occurrences.

As further shown in FIG. 5, process 500 may include converting the preprocessed data and the key intents into embeddings (block 530). For example, the device may convert the preprocessed data and the key intents into embeddings, as described above. In some implementations, converting the preprocessed data and the key intents into the embeddings includes utilizing one or more of a count vectorization technique, a bag of words technique, an N-gram vectorization technique, a term frequency-inverse document frequency vectorization technique, or a one-hot encoding technique, to convert the preprocessed data and the key intents into the embeddings.

As further shown in FIG. 5, process 500 may include combining the embeddings into an input vector (block 540). For example, the device may combine the embeddings into an input vector, as described above. In some implementations, combining the embeddings into the input vector comprises averaging the embeddings to generate the input vector.

As further shown in FIG. 5, process 500 may include processing the input vector, with a language model, to identify relationships between words and phrases of the text data (block 550). For example, the device may process the input vector, with a language model, to identify relationships between words and phrases of the text data, as described above. In some implementations, the language model is an encoder that represents the words and the phrases of the text data and maintains connections between the words and the phrases. In some implementations, the relationships between the words and the phrases of the text data includes connections between the words and the phrases.

As further shown in FIG. 5, process 500 may include processing the input vector and the relationships, with a summary generation model, to generate a summary of the text data (block 560). For example, the device may process the input vector and the relationships, with a summary generation model, to generate a summary of the text data, as described above. In some implementations, processing the input vector and the relationships, with the summary generation model, to generate the summary of the text data includes utilizing a beam search with the input vector and the relationships to generate the summary of the text data.

As further shown in FIG. 5, process 500 may include performing one or more actions based on the summary of the text data (block 570). For example, the device may perform one or more actions based on the summary of the text data, as described above. In some implementations, performing the one or more actions includes one or more of providing the summary of the text data for display to a user device, or performing a search for a topic based on the summary of the text data. In some implementations, performing the one or more actions includes determining a customer journey, issue, or need based on the summary of the text data, and utilizing the customer journey, issue, or need to provide a service to a customer.

In some implementations, performing the one or more actions includes one or more of identifying a category for the text data based on the summary of the text data, or enabling a content creator to create a document based on the summary of the text data. In some implementations, performing the one or more actions includes retraining the language model or the summary generation model based on the summary of the text data and to generate a retrained language model or a retrained summary generation model, and utilizing the retrained language model or the retrained summary generation model with new text data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, text data associated with a chatbot, a live chat, or an interactive voice response system;
   preprocessing, by the device, the text data with one or more preprocessing techniques to generate preprocessed data and key intents;
   converting, by the device, the preprocessed data and the key intents into embeddings;
   combining, by the device, the embeddings into an input vector;
   processing, by the device, the input vector, with a language model, to identify relationships between words and phrases of the text data;
   processing, by the device, the input vector and the relationships, with a summary generation model, to generate a summary of the text data; and
   retraining, by the device, utilizing the summary of the text data as training data, the language model or the summary generation model, wherein utilizing the summary of the text data as training data increases a quantity of training data available.

2. The method of claim 1, wherein preprocessing the text data with the one or more preprocessing techniques to generate the preprocessed data and the key intents comprises one or more of:
   determining a conversational format of the text data;
   generating tokens for the text data;
   providing parts of speech tags for the tokens;
   replacing pronouns in the text data with nouns;
   generating discourse labels for the text data; or
   filtering utterances in the text data.

3. The method of claim 1, wherein preprocessing the text data with the one or more preprocessing techniques to generate the preprocessed data comprises one or more of:
   performing a stop-word removal technique on the text data to generate the preprocessed data;
   performing a bad character removal technique on the text data to generate the preprocessed data;
   performing an abbreviation regular expression technique on the text data to generate the preprocessed data;
   performing a placeholder replace technique on the text data to generate the preprocessed data;
   performing a custom noun entity technique on the text data to generate the preprocessed data; or
   performing a lemmatization technique on the text data to generate the preprocessed data.

4. The method of claim 1, wherein preprocessing the text data with the one or more preprocessing techniques to generate the key intents comprises:
   identifying utterances in the text data;
   generating parts of speech tags for the text data;
   performing parts of speech sequencing on the parts of speech tags to generate sequenced parts of speech tags;
   detecting co-occurrences of words or phrases in the text data; and
   generating the key intents based on the utterances, the sequenced parts of speech tags, and the co-occurrences.

5. The method of claim 1, wherein converting the preprocessed data and the key intents into the embeddings comprises:
   utilizing one or more of a count vectorization technique, a bag of words technique, an N-gram vectorization technique, a term frequency-inverse document frequency vectorization technique, or a one-hot encoding technique, to convert the preprocessed data and the key intents into the embeddings.

6. The method of claim 1, wherein combining the embeddings into the input vector comprises:
averaging the embeddings to generate the input vector.

7. The method of claim 1, wherein the language model is an encoder that represents the words and the phrases of the text data and maintains connections between the words and the phrases.

8. A device, comprising:
one or more processors configured to:
receive text data associated with a chatbot, a live chat, or an interactive voice response system;
preprocess the text data with one or more preprocessing techniques to generate preprocessed data and key intents;
utilize one or more of a count vectorization technique, a bag of words technique, an N-gram vectorization technique, a term frequency-inverse document frequency vectorization technique, or a one-hot encoding technique to convert the preprocessed data and the key intents into embeddings;
combine the embeddings into an input vector;
process the input vector, with a language model, to identify relationships between words and phrases of the text data;
process the input vector and the relationships, with a summary generation model, to generate a summary of the text data;
perform one or more actions based on the summary of the text data; and
retrain the language model or the summary generation model, utilizing the summary of the text data as training data, to generate a retrained language model or a retrained summary generation model,
wherein utilizing the summary of the text data as training data increases a quantity of training data available.

9. The device of claim 8, wherein the relationships between the words and the phrases of the text data includes connections between the words and the phrases.

10. The device of claim 8, wherein the one or more processors, to process the input vector and the relationships, with the summary generation model, to generate the summary of the text data, are configured to:
utilize a beam search with the input vector and the relationships to generate the summary of the text data.

11. The device of claim 8, wherein the one or more processors, to perform the one or more actions, are configured to one or more of:
provide the summary of the text data for display to a user device; or
perform a search for a topic based on the summary of the text data.

12. The device of claim 8, wherein the one or more processors, to perform the one or more actions, are configured to:
determine a customer journey, issue, or need based on the summary of the text data; and
utilize the customer journey, issue, or need to provide a service to a customer.

13. The device of claim 8, wherein the one or more processors, to perform the one or more actions, are configured to one or more of:
identify a category for the text data based on the summary of the text data; or
enable a content creator to create a document based on the summary of the text data.

14. The device of claim 8, wherein the one or more processors are further configured to:
utilize the retrained language model or the retrained summary generation model with new text data.

15. A non-transitory computer-readable medium storing a set of instructions, the set of instructions comprising:
one or more instructions that, when executed by one or more processors of a device, cause the device to:
receive text data associated with a chatbot, a live chat, or an interactive voice response system;
preprocess the text data with one or more preprocessing techniques to generate preprocessed data and key intents;
convert the preprocessed data and the key intents into embeddings;
combine the embeddings into an input vector;
process the input vector, with a language model, to identify relationships between words and phrases of the text data,
wherein the language model is an encoder that represents the words and the phrases of the text data and maintains connections between the words and the phrases;
process the input vector and the relationships, with a summary generation model, to generate a summary of the text data; and
retrain the language model or the summary generation model, utilizing the summary of the text data as training data, wherein utilizing the summary of the text data as training data increases a quantity of training data available.

16. The non-transitory computer-readable medium of claim 15, wherein the one or more instructions, that cause the device to preprocess the text data with the one or more preprocessing techniques to generate the preprocessed data and the key intents, cause the device to:
determine a conversational format of the text data;
generate tokens for the text data;
provide parts of speech tags for the tokens;
replace pronouns in the text data with nouns;
generate discourse labels for the text data; or
filter utterances in the text data.

17. The non-transitory computer-readable medium of claim 15, wherein the one or more instructions, that cause the device to preprocess the text data with the one or more preprocessing techniques to generate the key intents, cause the device to:
identify utterances in the text data;
generate parts of speech tags for the text data;
perform parts of speech sequencing on the parts of speech tags to generate sequenced parts of speech tags;
detect co-occurrences of words or phrases in the text data; and
generate the key intents based on the utterances, the sequenced parts of speech tags, and the co-occurrences.

18. The non-transitory computer-readable medium of claim 15, wherein the one or more instructions, that cause the device to combine the embeddings into the input vector, cause the device to:
average the embeddings to generate the input vector.

19. The non-transitory computer-readable medium of claim 15, wherein the relationships between the words and the phrases of the text data include connections between the words and the phrases.

20. The non-transitory computer-readable medium of claim 15, wherein the one or more instructions, that cause the device to process the input vector and the relationships, with the summary generation model, to generate the summary of the text data, cause the device to:
  utilize a beam search with the input vector and the relationships to generate the summary of the text data.

\* \* \* \* \*